(No Model.) 2 Sheets—Sheet 1.

W. N. WHITELEY, W. BAYLEY & L. H. LEE
SELF BINDER.

No. 274,071. Patented Mar. 13, 1883.

Attest
M. V. Smith
J. C. Turner

Inventors
W. N. Whiteley
Wm Bayley
L. H. Lee
By their atty
R. S. Smith (No Model.) 2 Sheets—Sheet 2.
W. N. WHITELEY, W. BAYLEY & L. H. LEE.
SELF BINDER.
No. 274,071. Patented Mar. 13, 1883.
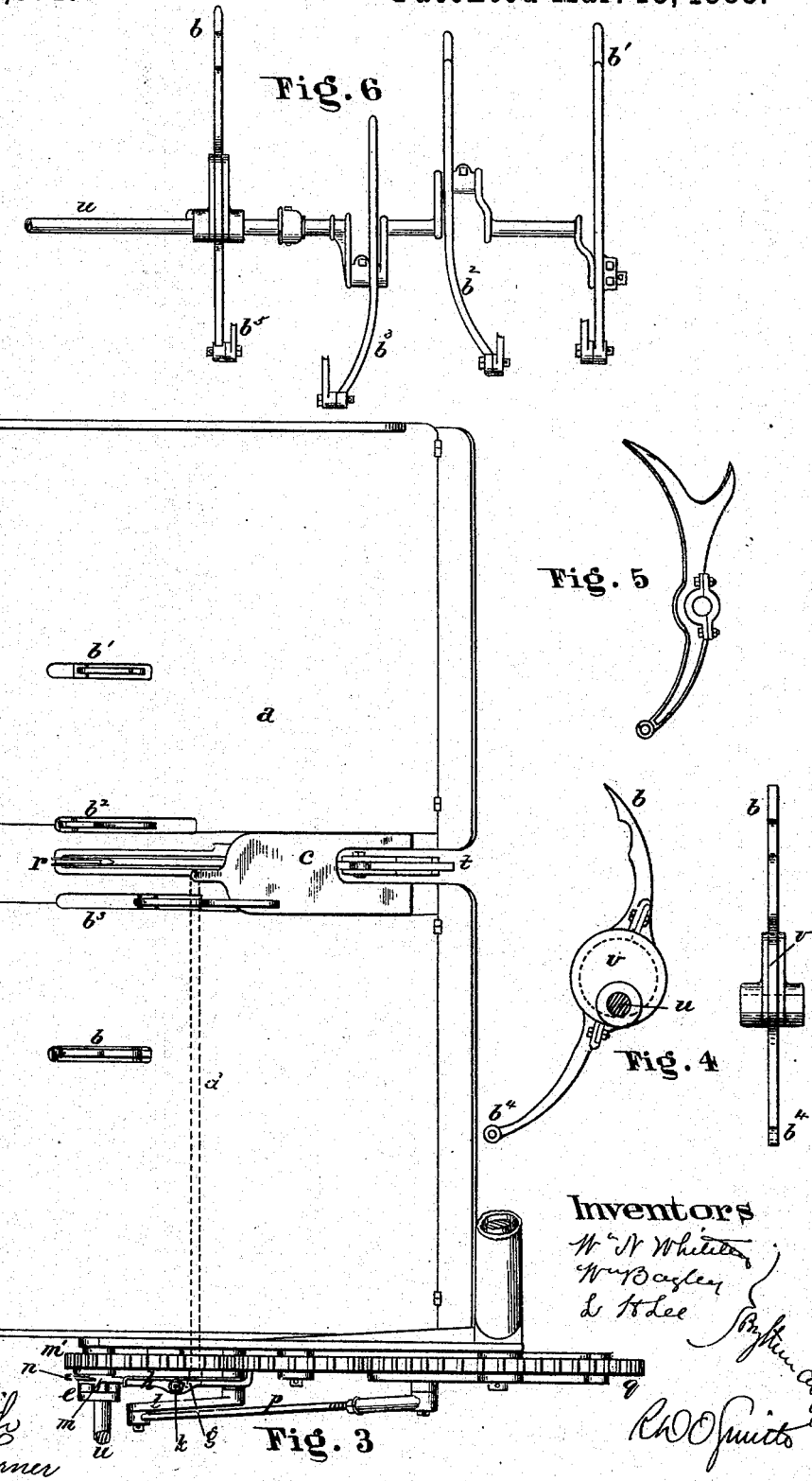

UNITED STATES PATENT OFFICE.

WILLIAM N. WHITELEY, WILLIAM BAYLEY, AND LEWIS H. LEE, OF SPRINGFIELD, OHIO, ASSIGNORS TO WHITELEY, FASSLER & KELLY, OF SAME PLACE.

SELF-BINDER.

SPECIFICATION forming part of Letters Patent No. 274,071, dated March 13, 1883.

Application filed June 27, 1882. (No model.)

*To all whom it may concern:*

Be it known that we, WILLIAM N. WHITELEY, WILLIAM BAYLEY, and L. H. LEE, of Springfield, in the county of Clarke, State of Ohio, have invented a new and useful Improvement in Self-Binders, of which the following is a full, clear, and exact description.

Figure 1:
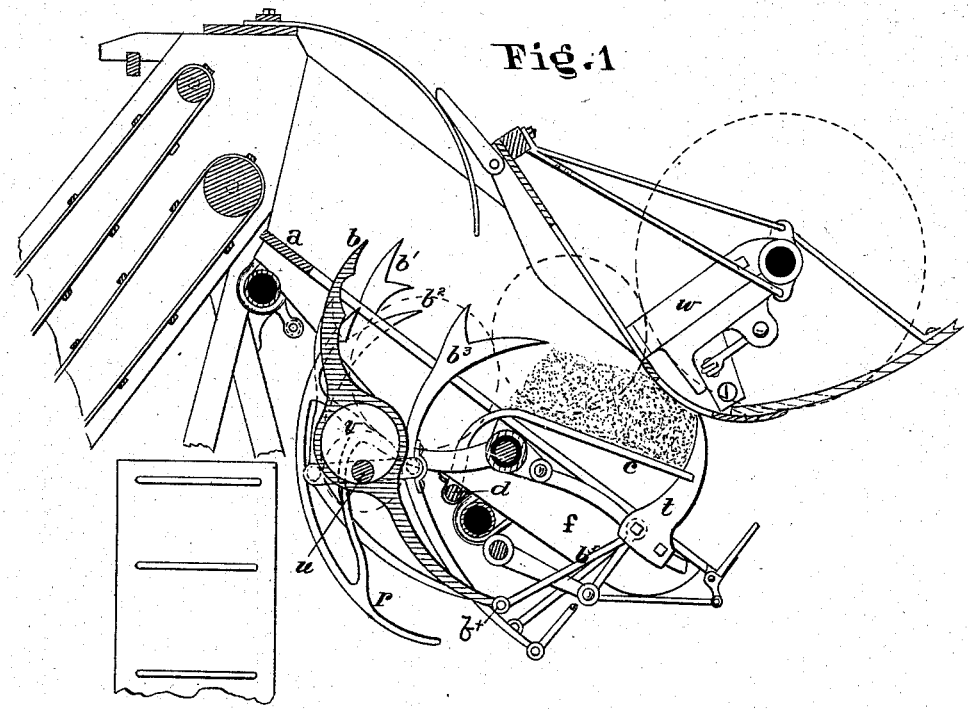
Figure 2:
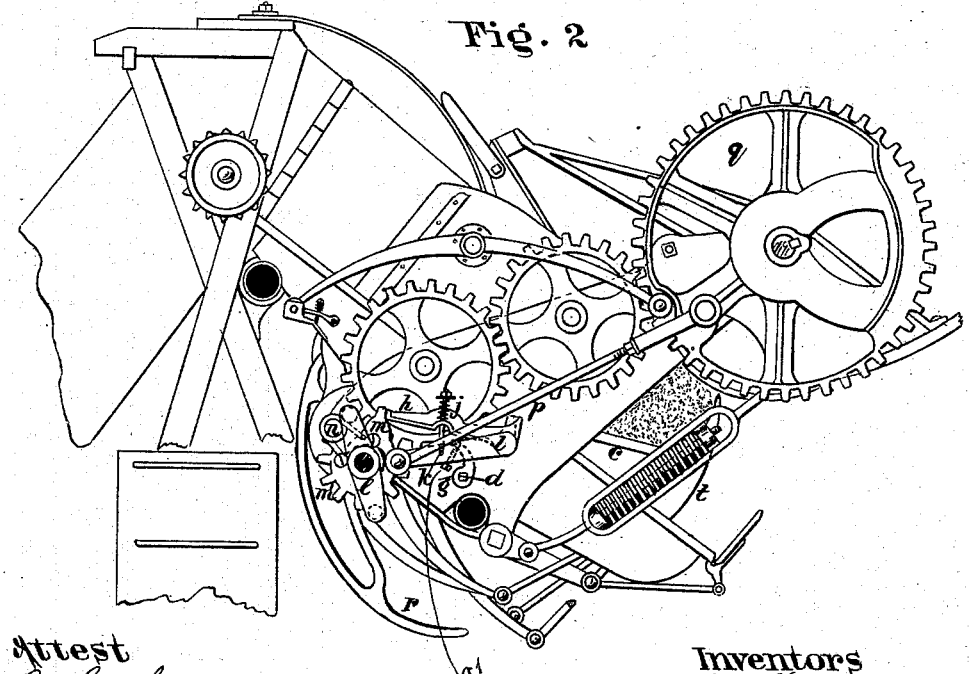

In the accompanying drawings, Figure 1 is a transverse sectional elevation of a binding-machine with our improvements attached thereto. Fig. 2 is a transverse elevation of the same. Fig. 3 is a plan view; Fig. 4, longitudinal and transverse elevations of our improved packer and operating mechanism; Fig. 5, an elevation of a packer driven by crank-movement; and Fig. 6 is a longitudinal elevation illustrative of the general arrangement of packers.

The invention relates to a device for automatically coupling a harvesting with a binding machine by the weight of the accumulating grain upon a tilting lever, and to other devices, which will be hereinafter described; and it consists, first, in a series of packers, either working in unison or alternating in their advance and retreat movements, that gradually take the grain deposited upon the binding-table and, little by little, pack it upon an arm extending from a rock-shaft that forms a part of an automatic coupling device that is thrown into operation by the movement of said rock-shaft by the weight of accumulated grain upon the extended arm thereof, in combination with a binding-receptacle in which a compress-finger forms one side.

To enable others skilled in the art to which our invention belongs to make and use our improvements, we will now proceed to describe their construction and connection with other well-known devices.

The grain as it is delivered upon the binding-table $a$ is brought into the path of the packers $b\ b'\ b^2\ b^3$, which remove it and pack it upon a tilting lever, $c$, having a broad receiving-surface that forms practically a lateral extension of a rock-shaft, $d$, and is connected with the coupling device $e$. The coupling device shown is one that is patented to John F. Appleby; but it is obvious that any other practical coupling device may be used with our improvements without departing from the spirit of the invention. The lever $c$ may be made of one piece with the rock-shaft $d$; or it may be made separate and properly connected thereto. The rock-shaft $d$ is suitably journaled to the framing $f$ of the binding-table, and extends through to the rear end of the binding-table, where it is provided with a lever, $g$, that engages with a spring trip-lever, $h$, that is journaled on the binding-arm shaft in a suitable manner to move freely upon said shaft for a limited distance, and then to move with it during the operation of binding. $g'$ is an adjusting-screw passing through the lever $g$, and resting at its point against the under side of the lever $h$, whereby the initial position of the lever $c$ may be regulated. This spring trip-lever $h$ is provided with a spring, $j$, that surrounds a screw-bolt, $k$, attached to the lever $l$, that serves to keep it down, and thereby prevent the coupling of the harvesting and binding mechanism until the weight of grain packed upon the lever $c$ overcomes the resistance of said spring, at which time the spring trip-lever $h$ will be raised through the agency of the lever $g$, that is attached to the rock-shaft $d$, and the latch $m$, that is pivoted to a pinion, $m'$, that forms one of a train of gear-wheels, will be forced by the spring $n$ into the path of the continuously-running dog $e$, and a union of harvesting and binding-machines takes place. The binding of the sheaf being accomplished in any well-known way, and the sheaf ejected, the spring trip-lever $h$ will descend with the lever $l$, that actuates the binding-arm through the agency of the connecting-rod $p$ and gear-wheel $q$, and the binding mechanism will come to rest by the latch $m$ engaging with the trip-lever $h$, and thereby departing from the path of the dog $e$. The table $a$ is then ready for a new supply of grain. The binding mechanism being started in the manner above described, the binding-arm $r$ ascends, and the grain is compressed between it and the compress-finger $t$. After the binding is complete the compress-finger is withdrawn, to permit the passage of the bound sheaf.

We use four packers to transfer the grain from the inner side of the binding-table to what may be termed the "binding-receptacle," composed of the lever $c$ at the bottom and the compress-finger $t$ at the side. These packers are arranged so that $b^2$ $b^3$ are near to the binding-arm—one on each side of it—while $b'$ is located so as to act upon the butts of the grain and $b^2$ upon the heads. The packer $b$ is driven by an eccentric, $v$, fast to the shaft $u$, its heel $b^4$ being pivoted to a vibrating pendant, $b^5$, which confines said packer to a fixed course of travel. It will be understood that any or all of said packers may be driven similarly, if it is so desired.

$w$ indicates the position of the knotting device used to tie the ends of the band material.

The inclination of the lever $c$ in relation to the binding-table $a$ allows the heads and butts of the grain to rest upon said table, while the middle rests upon the lever $c$, by which construction and arrangement sheaves of more uniform size will be attained while operating in grain having varying lengths of straw.

Having thus described our invention, what we claim as new, and desire to secure by Letters Patent, is—

1. In a binding-machine, the packers $b$ $b'$ $b^2$ $b^3$ and the compress-finger $t$, in combination with the rock-shaft $d$, provided with the tilting lever $c$, rigidly attached thereto, substantially as described, and for the purposes set forth.

2. In a binding-machine, the packers $b$ $b'$ $b^2$ $b^3$, the compress-finger $t$, the rock-shaft $d$, provided with tilting lever $c$, in combination with a suitable clutching mechanism, substantially as set forth.

3. A binding-machine provided with a system of packers, as described, a lever, $c$, extending laterally from a rock-shaft, $d$, an arm, $g$, also extending from the rock-shaft, and a coupling device composed of a continuously-revolving dog, $e$, a pivoted spring trip-lever, $h$ $j$ $k$, and a spring-latch, $m$ $n$, pivoted to a pinion, $m'$, that is loose upon a shaft, $u$, substantially as and for the purpose specified.

4. The pivoted trip-lever $h$, provided with bolt $k$, said bolt being surrounded by spring $j$, in combination with levers $c$ and $g$, rigidly secured to the rock-shaft $d$, the lever $g$ being provided with adjustment-screw $g'$, whereby the position of the lever $c$ may be regulated, as specified.

In testimony whereof we have hereunto set our hands this 17th day of June, 1882.

WILLIAM N. WHITELEY.
WILLIAM BAYLEY.
LEWIS H. LEE.

Witnesses:
HENRY MILLWARD,
E. O. BOWMAN.